United States Patent
Chen et al.

(10) Patent No.: US 8,982,298 B2
(45) Date of Patent: Mar. 17, 2015

(54) LIQUID CRYSTAL DISPLAY COMPRISING SPRINGS THAT HORIZONTALLY EXPAND AND CONTRACT A THIRD BACKPLANE UNIT RELATIVE TO A FIRST AND SECOND BACKPLANE

(75) Inventors: Shihhsiang Chen, Shenzhen (CN); Gege Zhou, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/577,727

(22) PCT Filed: Jul. 9, 2012

(86) PCT No.: PCT/CN2012/078333
§ 371 (c)(1),
(2), (4) Date: Aug. 8, 2012

(87) PCT Pub. No.: WO2014/005332
PCT Pub. Date: Jan. 9, 2014

(65) Prior Publication Data
US 2014/0002767 A1  Jan. 2, 2014

(30) Foreign Application Priority Data
Jul. 2, 2012  (CN) .......................... 201210223689.5

(51) Int. Cl.
  *G02F 1/1333*  (2006.01)
(52) U.S. Cl.
  CPC .................... *G02F 1/133308* (2013.01); *G02F 2001/133314* (2013.01)
  USPC ................................ 349/60; 349/58; 349/59
(58) Field of Classification Search
  CPC .............. G02F 1/133308; G02F 2001/133314; G02F 2001/133317; G02F 2001/13332; G02F 1/133615; G02F 1/133608
  USPC ....................... 349/58–62; 362/632–634, 97.1
  See application file for complete search history.

(56) References Cited

U.S. PATENT DOCUMENTS 7,125,157 B2 * 10/2006 Fu et al. ......................... 362/632
7,445,369 B2 * 11/2008 Yu et al. ......................... 362/612
(Continued)

FOREIGN PATENT DOCUMENTS

| CN | 201191340 Y | 2/2009 |
| CN | 201359237 Y | 12/2009 |

(Continued)

OTHER PUBLICATIONS

Liu Xiaohan, the International Searching Authority written comments, Mar. 2013, CN.

*Primary Examiner* — Paul Lee
*Assistant Examiner* — Agnes Dobrowolski
(74) *Attorney, Agent, or Firm* — IPro, Inc.; Na Xu

(57) ABSTRACT

The backplane for a liquid crystal display (LCD) device includes side walls, and the backplane at least includes two backplane units. A horizontal moving guide device is arranged between the adjacent backplane units, and an elastic device which enables the two backplane units to relatively elastically expand and contract horizontally is further arranged between the adjacent backplane units. The backplane of the LCD device of the present disclosure is designed to be able to elastically expand and contract in a direction perpendicular to a light emitting diode (LED) lightbar. When a light guide panel (LGP) in the backplane expands after absorbing heat, the backplane is extended by a pushing force, and heat expansion quantity of the LGP is directly absorbed. When the LGP is contracted because of temperature drop, the backplane is shortened under action of the elastic device, and a light coupling distance between the LGP and the LED lightbar is always kept constant.

5 Claims, 3 Drawing Sheets

(56) References Cited

U.S. PATENT DOCUMENTS

| | | | |
|---|---|---|---|
| 7,517,135 B2 * | 4/2009 | Yu | 362/633 |
| 7,600,909 B2 * | 10/2009 | Ohno | 362/633 |
| 7,883,252 B2 * | 2/2011 | Matsui et al. | 362/612 |
| 8,282,262 B2 * | 10/2012 | Matsui | 362/634 |
| 8,292,489 B2 * | 10/2012 | Chiu et al. | 362/634 |
| 2007/0019440 A1 | 1/2007 | Fang | |
| 2009/0097277 A1 * | 4/2009 | Iwasaki | 362/628 |
| 2011/0103092 A1 * | 5/2011 | Matsui | 362/612 |
| 2011/0292317 A1 * | 12/2011 | Kim et al. | 349/61 |

FOREIGN PATENT DOCUMENTS

| | | |
|---|---|---|
| CN | 102313210 A | 1/2012 |
| JP | 2000-137224 A | 5/2000 |
| JP | 2000137224 A | 5/2000 |
| JP | 2007-322697 A | 12/2007 |

* cited by examiner

LIQUID CRYSTAL DISPLAY COMPRISING SPRINGS THAT HORIZONTALLY EXPAND AND CONTRACT A THIRD BACKPLANE UNIT RELATIVE TO A FIRST AND SECOND BACKPLANE

TECHNICAL FIELD

This application is a national stage application of PCT application PCT/CN2012/078333filed on Jul. 9, 2012, which is based on and claims priority to Chinese patent application 201210223689.5 filed on Jun. 2, China. The entirety of each of the above-mentioned applications is hereby incorporated by reference herein in its entirety.

The present disclosure relates to the field of liquid crystal displays (LCDs), and more particularly to a backplane for an LCD device, and an LCD device.

BACKGROUND

Typical edge-lit LCD devices in mass production needs to employ a light guide panel (LGP). Because the light coupling distance between a light source of a backlight module and the LGP is required to be accurate, the LGP tends to be rigidly positioned. However, the light emitting diode (LED) lightbar of the LCD device radiates heat while in use, which heats and expands the LGP made of high polymer material such as polymethyl methacrylate (PMMA), poly carbonate (PC) and the like. Because a positioning structure has no buffer performance, the following problems may come: the heat expansion or cold contraction quantity of the LGP cannot be fully absorbed, easily causing the warpage and deformation of the LGP. Additionally, the LGP is in rigid contact with the positioning structure, easily causing the LGP to be fractured when being impacted.

To solve the aforementioned problems, as shown in FIG. 1, an LGP 2 is arranged in a backplane 1, and a part of an LCD device is specially reserved with an expansion clearance for the LGP 2. Thus, a long light coupling distance is generated between an LED lightbar 3 and the LGP 2, and light incident efficiency is reduced.

SUMMARY

In view of the above-described problems, the aim of the present disclosure is to provide a backplane for a liquid crystal display (LCD) device, and an LCD device with the advantages of no reserved expansion clearance and high light incident efficiency.

A first technical scheme of the present disclosure is that: a backplane for an LCD device comprises side walls. The backplane at least comprises two backplane units, a horizontal moving guide device is arranged between the adjacent backplane units, and an elastic device which enables the two backplane units to relatively elastically expand and contract horizontally is further arranged between the adjacent backplane units.

In one example, edges of the adjacent backplane units are superposed up and down. The horizontal moving guide device comprises rivets and waist-shaped holes which are respectively arranged on the two backplane units. The rivets penetrate through the waist-shaped holes, thereby fixing the two backplane units up and down. Because the backplane of a separate structure is used, overall strength of the backplane may be reduced generally. However, the matching structures of the rivets and the waist-shaped holes of the present disclosure have high strength, thereby preventing the overall strength of the backplane from being significantly reduced.

In one example, the number of the rivets and the waist-shaped holes is multiple. Multiple groups of rivets and waist-shaped holes enable a friction force between the backplane units to be reduced, thus, the backplane units can smoothly expand and contract.

In one example, the horizontal moving guide device comprises guide posts and guide sleeves which are respectively arranged on the two backplane units. The guide posts are arranged in the guide sleeves, thereby fixing the two backplane units up and down. The guide posts can only move in an axial direction of the guide sleeves, namely the two backplane units can only expand and contract in a vertical direction of the LED lightbar. Generally, two or more than two groups of guide posts and guide sleeves are generally required to be arranged, to enable the backplane units to smoothly expand and contract. The matching structures of the guide posts and guide sleeves also have the advantages of high strength and easy realization.

In one example, the elastic device comprises springs. The two ends of the springs are respectively arranged on the two backplane units.

Preferably, the backplane units are configured with rivet bolts, the springs are configured with pulling hooks, and the pulling hooks are hung on the rivet bolts. Or the backplane units are configured with integratedly punch-formed fixed blocks, and the pulling hooks of the springs are hung on the fixed blocks. The pulling hooks of the springs are conveniently hung on the rivet bolts or the fixed blocks, facilitating manual operation.

In one example, the number of the springs is multiple, to prevent inclination from being generated between the two backplane units.

In one example, the horizontal moving guide device comprises three groups of rivets and waist-shaped holes, and the elastic device comprises two springs. The springs are distributed among the three groups of rivets and waist-shaped holes at intervals, to enable a pulling force between the two backplane units to be more uniform.

Preferably, the backplane units are configured with protrusion structures, and the springs are arranged inside the protrusion structures. Arranging the springs inside the backplane can reduce influence of the springs on adjustment of other structures, and make an appearance of the backplane tidier.

The present disclosure further provides a second technical scheme: an LCD device comprises the aforementioned backplane, a light emitting diode (LED) lightbar(s), and an light guide panel (LGP). Both the LED lightbar and the LGP are arranged in the backplane, the LED lightbar is in parallel with a pair of side walls of the backplane, and the backplane units relatively expand and contract to move in a direction perpendicular to the LED lightbar.

A third technical scheme of the present disclosure is that: an LCD device comprises a backplane, LED lightbar(s), and an LGP. The backplane comprises side walls, and the backplane at least comprises two backplane units. A horizontal moving guide device is arranged between the adjacent backplane units, and an elastic device which enables the two backplane units to relatively elastically expand and contract horizontally is further arranged between the adjacent backplane units. Both the LED lightbar and the LGP are arranged in the backplane. The LED lightbar is in parallel with a pair of side walls of the backplane. The backplane units relatively expand and contract to move in the direction perpendicular to the LED lightbar, and the edges of the adjacent backplane units are superposed up and down. The horizontal moving guide device comprises rivets and waist-shaped holes which are respectively arranged on the two backplane units. The rivets penetrate through the waist-shaped holes, thereby fixing the two backplane units up and down. The elastic device comprises springs. The two ends of the springs are respectively arranged on the two backplane units, the backplane units are configured with integratedly punch-formed fixed blocks, the springs are configured with pulling hooks, and the pulling hooks are hung on the fixed blocks. The horizontal moving guide device comprises three groups of rivets and waist-shaped holes, and the elastic device comprises two springs. The springs are distributed among the three groups of rivets and waist-shaped holes at intervals. The backplane units are configured with protrusion structures, and the springs are arranged inside the protrusion structures.

Advantages of the present disclosure are summarized below: the backplane for an LCD device of the present disclosure is of a separate structure, and at least comprises two backplane units. A horizontal moving guide device is arranged between the adjacent backplane units, to enable the backplane units to relatively horizontally move, namely a size of the whole backplane formed by the backplane units can be expanded and contracted. An elastic device which enables the two backplane units to horizontally and elastically expand and contract is further arranged between the adjacent backplane units. The elastic device is generally configured with preset pulling force or preset pressure. When the backplane is not imposed by an external force in a horizontal direction, the size of the whole backplane is kept to be minimum under action of the elastic device. When the backplane is imposed by the external force, the backplane is extended in the horizontal direction, thereby realizing the expansion and contraction of the length in a certain horizontal direction.

The backplane of the LCD device of the present disclosure is designed to be able to elastically expand and contract in the direction perpendicular to the LED lightbar. When the LGP in the backplane expands after absorbing heat, the backplane is extended by a pushing force, and heat expansion quantity of the LGP is directly absorbed, thereby effectively preventing warpage and deformation of the LGP. When the LGP is contracted because of temperature drop, the backplane is shortened under the action of the elastic device, the light coupling distance between the LGP and the LED lightbar is always kept constant, as zero distance basically, thereby improving higher light incident efficiency.

DETAILED DESCRIPTION

Figure 1:
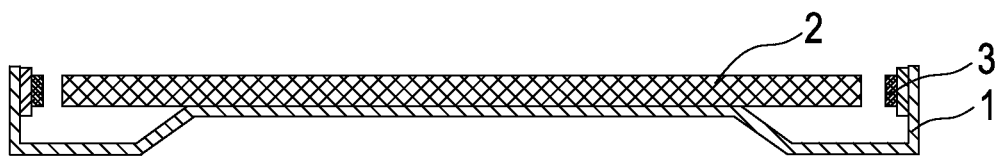
FIG. 1 is a structural sectional view of a typical LCD device in the prior art.
Figure 2:
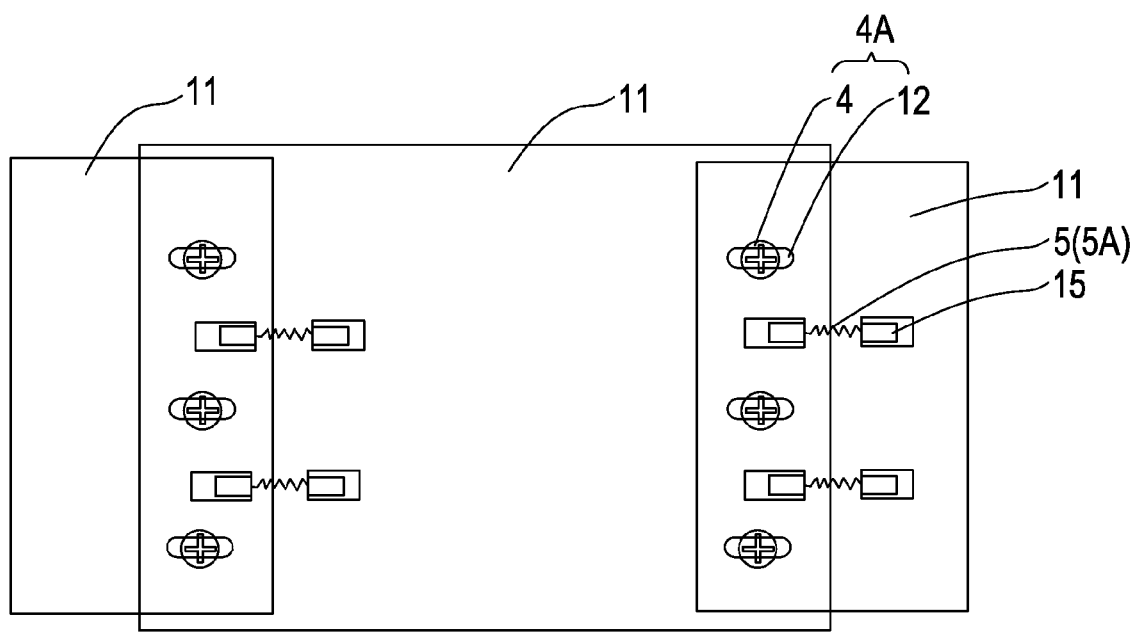
FIG. 2 is a structure diagram of an example of an LCD device of the present disclosure.
Figure 3:
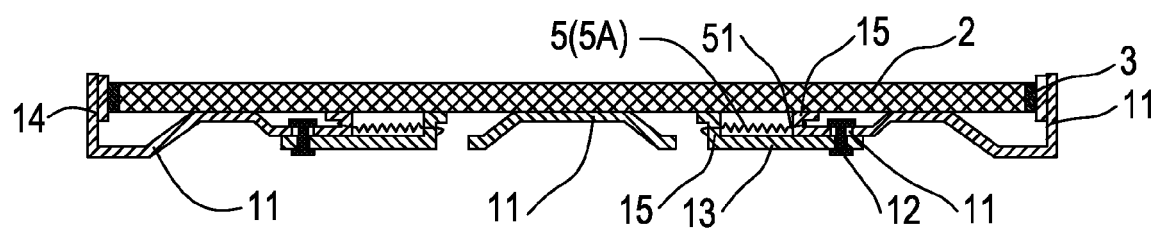
FIG. 3 is a sectional view of an LCD device of an example of the present disclosure.

The present disclosure provides a liquid crystal display (LCD) device. FIG. 2 and FIG. 3 show an example of the LCD device of the present disclosure. The LCD device comprises a backplane, a light guide panel (LGP) 2, and light emitting diode (LED) lightbar(s) 3. Both the LED lightbar 3 and the LGP 2 are arranged in the backplane. The backplane comprises side walls 14. The LED lightbar 3 is in parallel with a pair of side walls 14 of the backplane. The backplane at least comprises two backplane units 11. A horizontal moving guide device is arranged between the adjacent backplane units 11, and an elastic device which enables the two backplane units 11 to relatively elastically expand and contract horizontally is further arranged between the adjacent backplane units 11. The backplane units 11 can relatively expand and contract to move in a direction perpendicular to the LED lightbar 3.

The backplane for an LCD device of the present disclosure is of a separate structure, and at least comprises two backplane units 11. A horizontal moving guide device 4A is arranged between the adjacent backplane units 11, to enable the backplane units 11 to relatively horizontally move, namely a size of whole backplane formed by the backplane units 11 can be expanded and contracted. An elastic device 5A which enables the two backplane units to horizontally and elastically expand and contract is further arranged between the adjacent backplane units 11. The elastic device 5A is generally configured with preset pulling force or preset pressure. When the backplane is not imposed by an external force in a horizontal direction perpendicular to the LED lightbar, the size of the whole backplane is kept to be minimum under action of the elastic device. When the backplane is imposed by the external force, the backplane is extended in the horizontal direction, thereby realizing expansion and contraction of length in the horizontal direction perpendicular to the LED lightbar.

The backplane of the LCD device of the present disclosure is designed to be able to elastically expand and contract in the direction perpendicular to the LED lightbar. When the LGP in the backplane expands after absorbing heat, the backplane is extended by a pushing force, and heat expansion quantity of the LGP is directly absorbed, thereby effectively preventing warpage and deformation of the LGP. When the LGP is contracted because of temperature drop, the backplane is shortened under the action of the elastic device, and a light coupling distance between the LGP and the LED lightbar is always kept constant, as zero distance basically, thereby improving higher light incident efficiency.

In the example, edges of the adjacent backplane units 11 are superposed up and down. The horizontal moving guide device 4A comprises rivets 4 and waist-shaped holes 12 which are respectively arranged on the two backplane units 11. The rivets 4 penetrate through the waist-shaped holes 12, thereby fixing the two backplane units 11 up and down. A length direction of the waist-shaped holes 12 is perpendicular to the LED lightbar 3. Because the rivets 4 can only move in the length direction of the waist-shaped holes 12, the two backplane units 11 can only expand and contract in the length direction of the waist-shaped holes 12, namely the two backplane units can only expand and contract in the direction perpendicular to the LED lightbar, to control the light coupling distance between the LED lightbar 3 and the LGP 2. Because the backplane of a separate structure is used, overall strength of the backplane may be reduced generally. However, the matching structures of the rivets 4 and the waist-shaped holes 12 of the present disclosure have high strength, thereby preventing the overall strength of the backplane from being significantly reduced. Moreover, in the example, multiple groups of rivets 4 and waist-shaped holes 12 are arranged, specifically three groups of rivets and waist-shaped holes, which are distributed in the middle and two sides of the backplane units 11, thereby reducing a friction force between the backplane units 11 to enable the backplane units 11 to expand and contract more smoothly.

In the example, the elastic device 5A comprises springs 5. The two ends of the spring 5 are respectively arranged on the two backplane units 11. The backplane units 11 are configured with integratedly punch-formed fixed blocks 15, the springs 5 are configured with pulling hooks 51, and the pulling hooks 51 of the springs are hung on the fixed blocks 15. The springs 5 are preset with certain pulling force. When the LGP 2 is not installed, the backplane is kept in the minimum size. The backplane units are integratedly punch-formed with fixed blocks 15, thus, manufacturing cost of the backplane units 11 is reduced, and the pulling hooks 51 of the springs are conveniently hung on the fixed blocks 15, thereby facilitating manual operation.

In the example, the number of the springs 5 is multiple, specifically two springs 5. The springs 5 are symmetrically arranged. Thus, the side wall 14 of the backplane is close to the LED lightbar 3 in parallel, to prevent inclination from being generated between the two backplane units 11. The springs 5 are distributed among the three groups of rivets 4 and waist-shaped holes 12 at intervals, to enable the pulling force between the two backplane units 11 to be more uniform.

In the example, the backplane units 11 are configured with protrusion structures 13, and the springs 5 are arranged inside the protrusion structures 13. After being arranged, the springs 5 are not be touched in general. Arranging the springs 5 inside the backplane can reduce the influence of the springs 5 on the adjustment of other structures, and make an appearance of the backplane tidier.

In the example, the number of the backplane units 11 is three. The backplane units 11 at two ends can be expanded and contracted relative to the middle backplane unit 11, to enable the LED lightbars 3 at two ends to be closely attached to the LGP 2. Optionally, the number of the backplane units can be two or more than three, and the same advantages can be obtained.

In the aforementioned example, the horizontal moving guide device can comprise guide posts and guide sleeves which are respectively arranged on the two backplane units. The guide posts are arranged in the guide sleeves, thereby fixing the two backplane units up and down. An axial direction of the guide posts and the guide sleeves is perpendicular to the LED lightbar. The guide posts can only move in the axial direction of the guide sleeves, namely the two backplane units can only expand and contract in the direction perpendicular to the LED lightbar. Two or more groups of the guide posts and the guide sleeves are generally required to be arranged, to enable the backplane units to smoothly expand and contract. The matching structures of the guide posts and guide sleeves also have the advantages of high strength and easy realization.

In the example, the backplane units may be not integratedly formed with fixed blocks, but be configured with rivet bolts, and the pulling hooks of the springs are hung on the rivet bolts. Thus, an aim of tensioning the two backplane units can also be achieved.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A backplane for an liquid crystal displays (LCD) device, comprising:
   a first backplane units and a second backplane units each comprising a side wall close to lateral edges of a light guide panel (LGP) of the LCD device and a bottom portion below a bottom edge of the LGP; and
   an elastic device below the bottom edge of the LGP of the LCD device, the elastic device being arranged between the first and second backplane units;
   wherein the elastic device enables the first and second backplane units to relatively and elastically expand and contract horizontally, and the elastic device enables side walls of the first and second backplane units to relatively expand and contract horizontally;
   further comprising a third backplane unit arranged below the bottom edge of the LGP of the LCD device, the third backplane unit is arranged between the first and second backplane units, the elastic device are designated as a first elastic device and a second elastic device, two opposite ends of the third backplane unit are respectively connected to bottom portions of the first and second backplane units via the first and second elastic devices, the first elastic device enables the side wall of the first backplane unit to horizontally expand and contract relative to the third backplane unit, and the second elastic device enables the side wall of the second backplane unit to horizontally expand and contract relative to the third backplane unit;
   wherein the elastic device comprises springs; two ends of the springs are respectively arranged on the two adjacent backplane units,
   wherein the adjacent backplane units are configured with rivet bolts, the springs are configured with pulling hooks, and the pulling hooks are hung on the rivet bolts; or the adjacent backplane units are configured with integratedly punch-formed fixed blocks, and the pulling hooks of the springs are hung on the fixed blocks.

2. A backplane for an liquid crystal displays (LCD) device, comprising:
   a first backplane units and a second backplane units each comprising a side wall close to lateral edges of a light guide panel (LGP) of the LCD device and a bottom portion below a bottom edge of the LGP; and
   an elastic device below the bottom edge of the LGP of the LCD device, the elastic device being arranged between the first and second backplane units;
   wherein the elastic device enables the first and second backplane units to relatively and elastically expand and contract horizontally, and the elastic device enables side walls of the first and second backplane units to relatively expand and contract horizontally,
   further comprising a third backplane unit arranged below the bottom edge of the LGP of the LCD device, the third backplane unit is arranged between the first and second backplane units, the elastic device are designated as a first elastic device and a second elastic device, two opposite ends of the third backplane unit are respectively connected to bottom portions of the first and second backplane units via the first and second elastic devices, the first elastic device enables the side wall of the first backplane unit to horizontally expand and contract relative to the third backplane unit, and the second elastic device enables the side wall of the second backplane unit to horizontally expand and contract relative to the third backplane unit,
   wherein the elastic device comprises springs; two ends of the springs are respectively arranged on the two adjacent backplane units,
   wherein the number of the springs is multiple,
   wherein the horizontal moving guide device comprises three groups of rivets and waist-shaped holes; the elastic device comprises two springs, and the springs are distributed among the three groups of rivets and waist-shaped holes at intervals.

3. The backplane for an LCD device of claim 1, wherein the adjacent backplane units are configured with protrusion structures, and the springs are arranged inside the protrusion structures.

4. A liquid crystal displays (LCD) device, comprising:
an light emitting diode (LED) lightbar(s);
an light guide panel (LGP);
a backplane comprising a first backplane unit and a second backplane unit, the first and second backplane units each comprising a side wall close to lateral edges of the LGP and a bottom portion below a bottom edge of the LGP; and
an elastic device below the bottom edge of the LGP of the LCD device, the elastic device being arranged between the first and second backplane units;
wherein the elastic device enables the first and second backplane units to relatively and elastically expand and contract horizontally, and the elastic device enables side walls of the first and second backplane units to relatively expand and contract horizontally; and
wherein the LED lightbar and the LGP are arranged in the backplane, the LED lightbar is in parallel with a pair of side walls of the backplane, and the first and second backplane units relatively expand and contract to move in a direction perpendicular to the LED lightbar, further comprising a third backplane unit arranged below the bottom edge of the LGP of the LCD device, the third backplane unit is arranged between the first and second backplane units, the elastic device are designated as a first elastic device and a second elastic device, two opposite ends of the third backplane unit are respectively connected to bottom portions of the first and second backplane units via the first and second elastic devices, the first elastic device enables the side wall of the first backplane unit to horizontally expand and contract relative to the third backplane unit, and the second elastic device enables the side wall of the second backplane unit to horizontally expand and contract relative to the third backplane unit,
wherein the elastic device comprises springs; two ends of the springs are respectively arranged on the two adjacent backplane units,
wherein the adjacent backplane units are configured with rivet bolts, the springs are configured with pulling hooks, and the pulling hooks are hung on the rivet bolts; or the backplane units are configured with integratedly punch-formed fixed blocks, and the pulling hooks of the springs are hung on the fixed blocks.

5. The LCD device of claim 4, wherein the adjacent backplane units are configured with protrusion structures, and the springs are arranged inside the protrusion structures.

* * * * *